United States Patent
Mori

(10) Patent No.: US 10,569,602 B2
(45) Date of Patent: Feb. 25, 2020

(54) HEAVY LOAD TIRE WITH SPECIFIED BELT LAYERS

(71) Applicant: BRIDGESTONE CORPORATION, Tokyo (JP)

(72) Inventor: Yosuke Mori, Kawasaki (JP)

(73) Assignee: BRIDGESTONE CORPORATION, Tokyo (JP)

( * ) Notice: Subject to any disclaimer, the term of this patent is extended or adjusted under 35 U.S.C. 154(b) by 806 days.

(21) Appl. No.: 14/763,682

(22) PCT Filed: Feb. 5, 2014

(86) PCT No.: PCT/JP2014/000611
§ 371 (c)(1),
(2) Date: Jul. 27, 2015

(87) PCT Pub. No.: WO2014/125794
PCT Pub. Date: Aug. 21, 2014

(65) Prior Publication Data
US 2015/0352901 A1 Dec. 10, 2015

(30) Foreign Application Priority Data
Feb. 12, 2013 (JP) .................. 2013-024528

(51) Int. Cl.
*B60C 9/20* (2006.01)
*B60C 9/22* (2006.01)
(Continued)

(52) U.S. Cl.
CPC .................. *B60C 9/20* (2013.01); *B60C 3/04* (2013.01); *B60C 9/185* (2013.01); *B60C 9/2006* (2013.01);
(Continued)

(58) Field of Classification Search
CPC ..... Y10T 152/10792; Y10T 152/10801; B60C 9/1835; B60C 9/2006; B60C 9/22;
(Continued)

(56) References Cited

U.S. PATENT DOCUMENTS 2,225,042 A * 12/1940 Elliott ....................... 152/538 X
4,702,293 A * 10/1987 Iwata ........................ B60C 9/22
152/531 X (Continued)

FOREIGN PATENT DOCUMENTS

CN 1604858 A 4/2005
CN 1822963 A 8/2006
(Continued)

OTHER PUBLICATIONS

Apr. 1, 2014 International Search Report issued in International Patent Application No. PCT/JP2014/000611.
(Continued)

*Primary Examiner* — Adrienne C. Johnstone
(74) *Attorney, Agent, or Firm* — Oliff PLC

(57) ABSTRACT

Provided is a heavy load tire that includes: the first belt layer including a cord extending in the tire circumferential direction; the second belt layer including a cord extending to be inclined with respect to the tire circumferential direction; and the third belt layer including a cord extending to be inclined at an angle of 30° or less with respect to the tire circumferential direction in a direction opposite to that of the cord of the second belt layer. The first, the second, and the third belt layer are arranged in the stated order from the inner side to the outer side in the tire radial direction. The third belt layer has a width $w_3$ that is 80% or more of a tread width w, and the second belt layer has a width $w_2$. The width $w_2$ and the width $w_3$ satisfy the relation $w_2 < w_3$.

5 Claims, 2 Drawing Sheets

(51) Int. Cl.
*B60C 9/28* (2006.01)
*B60C 9/18* (2006.01)
*B60C 3/04* (2006.01)
*B60C 11/03* (2006.01)

(52) U.S. Cl.
CPC .............. *B60C 9/22* (2013.01); *B60C 9/28* (2013.01); *B60C 11/0306* (2013.01); *B60C 2009/2016* (2013.01); *B60C 2009/2019* (2013.01); *B60C 2009/2074* (2013.01); *B60C 2011/039* (2013.01); *B60C 2011/0344* (2013.01); *B60C 2011/0381* (2013.01); *B60C 2200/06* (2013.01); *Y10T 152/10792* (2015.01); *Y10T 152/10801* (2015.01)

(58) Field of Classification Search
CPC . B60C 9/2204; B60C 9/28; B60C 2009/1878; B60C 2009/2012; B60C 2009/2016; B60C 2009/2019
USPC .................. 152/531, 534, 535, 538, 532
See application file for complete search history.

(56) References Cited

U.S. PATENT DOCUMENTS

| | | | | |
|---|---|---|---|---|
| 5,383,507 A * | 1/1995 | Sato | .................. | B60C 9/22 |
| | | | | 152/531 X |
| 5,996,662 A | 12/1999 | Cluzel | | |
| 6,491,077 B1 * | 12/2002 | Lopez | .................. | 152/531 X |
| 6,561,241 B2 * | 5/2003 | Rayman | .................. | B60C 9/22 |
| | | | | 152/531 X |
| 6,668,890 B1 * | 12/2003 | Kadota | .................. | B60C 9/2009 |
| | | | | 152/526 |
| 6,708,747 B1 | 3/2004 | Tsuruta et al. | | |
| 7,404,425 B2 * | 7/2008 | Hardy | .................. | B60C 9/2204 |
| | | | | 152/531 X |
| 2007/0144650 A1 * | 6/2007 | Tsuda | .................. | B60C 9/18 |
| | | | | 152/537 |
| 2010/0154958 A1 * | 6/2010 | Nicolas | .................. | B60C 9/28 |
| | | | | 152/534 X |
| 2014/0238573 A1 * | 8/2014 | Herta | .................. | 152/535 |

FOREIGN PATENT DOCUMENTS

| | | | |
|---|---|---|---|
| CN | 101842252 A | | 9/2010 |
| EP | 1454766 A1 | | 9/2004 |
| GB | 1 483 053 A | * | 8/1977 |
| JP | H02-88306 A | | 3/1990 |
| JP | 06183206 A | * | 7/1994 |
| JP | 07125507 A | * | 5/1995 |
| JP | 07164818 A | * | 6/1995 |
| JP | 2000-062411 A | | 2/2000 |
| JP | 2008-155730 A | | 7/2008 |
| JP | 2010-143279 A | | 7/2010 |
| JP | 2011-162023 A | | 8/2011 |
| JP | 5087269 B2 | | 12/2012 |
| WO | 2012/052522 A1 | | 4/2012 |
| WO | WO-2013/064296 A1 | * | 5/2013 |

OTHER PUBLICATIONS

Apr. 1, 2014 Office Action issued in Japanese Patent Application No. 2013-024528.

* cited by examiner

HEAVY LOAD TIRE WITH SPECIFIED BELT LAYERS

TECHNICAL FIELD

The present disclosure relates to a heavy load tire including a pair of bead portions, a carcass extending toroidally between the pair of bead cores, and belt layers located on an outer circumferential side of a crown region of the carcass.

BACKGROUND

Heavy load tires used in trucks and buses include, for example, a pneumatic tire described in Patent Literature 1. The pneumatic tire of Patent Literature 1 is capable of improving fatigue resistance of cords used, in particular, in end portions of circumferential belt layers in the widthwise direction while preventing occurrence of local wear of a tread surface.

CITATION LIST

Patent Literature

PL1: JP2011-162023A

SUMMARY

Technical Problem

There have been needs for better technologies for reducing shoulder edge wear (which refers to wear occurring in the vicinity of ground contact ends of shoulder portions), which is a kind of partial wear.

The present disclosure is to solve the above problem effectively and to provide a tire that is capable of reducing shoulder edge wear sufficiently.

Solution to Problem

One aspect of the present disclosure provides a heavy load tire that includes a pair of bead portions and a carcass extending toroidally between the pair of bead portions. The heavy load tire, on an outer circumferential side of a crown region of the carcass, includes: the first belt layer including a cord extending in the tire circumferential direction; the second belt layer including a cord extending to be inclined with respect to the tire circumferential direction; and the third belt layer including a cord extending to be inclined at an angle of 30° or less with respect to the tire circumferential direction in a direction opposite to that of the cord of the second belt layer. The first belt layer, the second belt layer, and the third belt layer are arranged in the stated order from the inner side to the outer side in the tire radial direction. The third belt layer has a width $w_3$ that is 80% or more of a tread width w, and the second belt layer has a width $w_2$. The width $w_2$ and the width $w_3$ satisfy the relation $w_2 < w_3$.

Herein, dimensions such as the widths of the belt layers are measured in a state where the tire is assembled with an application rim and inflated with a specified internal pressure, with no load being applied thereon.

The "tread width" herein refers to a length between tread ends in the tire width direction measured in the above state. The "tread end" refers to an outermost ground contact position of a footprint in the tire width direction in a state where the tire is assembled with the application rim and inflated with the specified internal pressure, with a load corresponding to the maximum load capacity being applied thereon.

The cord of the belt layer "extending in the tire circumferential direction" herein encompass not only the cord of the belt layer extending in the tire circumferential direction, but also the cord of the belt layer extending substantially in the tread circumferential direction by being inclined at an angle of less than 10° with respect to the tire circumferential direction.

Herein, an "application rim" represents a rim prescribed for each tire size by the standard described below. In detail, an "application rim" represents a standard rim (which is also called an "approved rim" or a "recommended rim") in an applicable size prescribed by an industrial standard which is valid in an area where the tire is manufactured and used. Examples of the industrial standard include: The Tire And Rim Association Inc., "YEAR BOOK" in the United States; The European Tyre And Rim Technical Organization, "STANDARDS MANUAL" in Europe; the Japan Automobile Tire Manufacturers Association Inc., "JATMA YEAR BOOK" in Japan and the like. A "specified internal pressure" represents an air pressure specified by the above standard in correspondence with the maximum load capacity of the tire, and the "maximum load capacity" represents the maximum mass that may be applied to the tire according to the above standard.

Advantageous Effect

The heavy load tire according to the present disclosure is capable of reducing shoulder edge wear sufficiently.

DETAILED DESCRIPTION

An exemplary embodiment of a heavy load tire according to the present disclosure will be described below with reference to the drawings.

Figure 1:
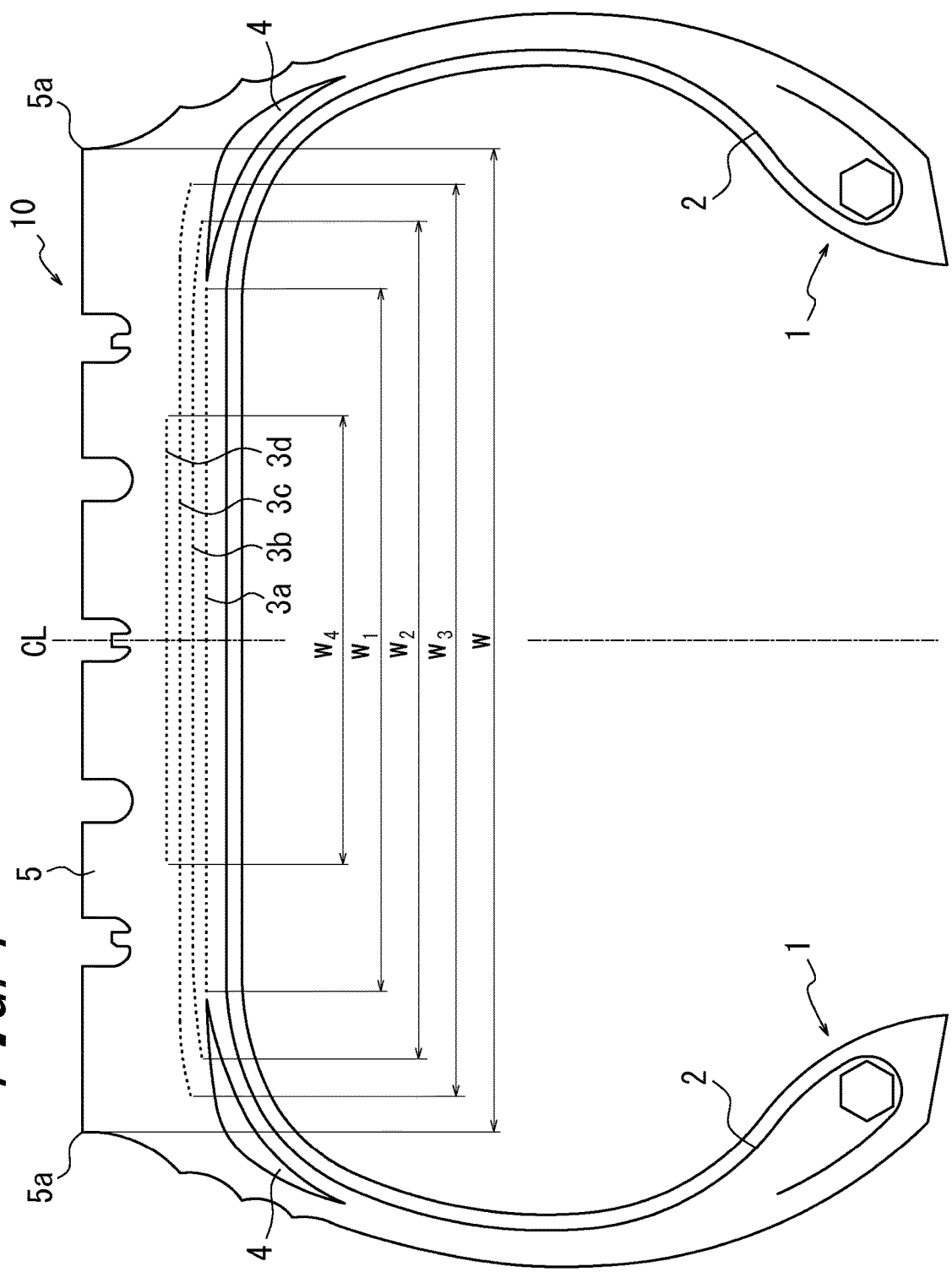
FIG. 1 is a sectional view in the tire width direction illustrating one embodiment of a heavy load tire according to the present disclosure.

A heavy load tire 10 of the embodiment illustrated in FIG. 1 is used preferably in trucks and buses. The heavy load tire 10 includes a pair of bead portions 1 and a carcass 2 composed of at least one carcass ply extending toroidally between the pair of bead portions 1. In a crown region of the carcass 2, the heavy load tire 10 also includes the first to the fourth belt layer 3a to 3d arranged in the stated order from the inner side to the outer side in the tire radial direction. Tread rubber is also located outward of the first to the fourth belt layer 3a to 3d in the tire radial direction. The crown region of the carcass, the first to the fourth belt layer 3a to 3d, and the tread rubber as a whole form a tread portion 5, which constitutes a crown region of the tire. The heavy load tire 10 further includes a reinforcing rubber layer 4 on both sides in the tire width direction. Each reinforcing rubber layer 4 is located inward of the second belt layer 3b in the tire radial direction and extends from a position that is outward of the first belt layer 3a in the tire width direction to, in the present embodiment, an outer end portion of a sidewall portion in the tire radial direction.

Figure 2:
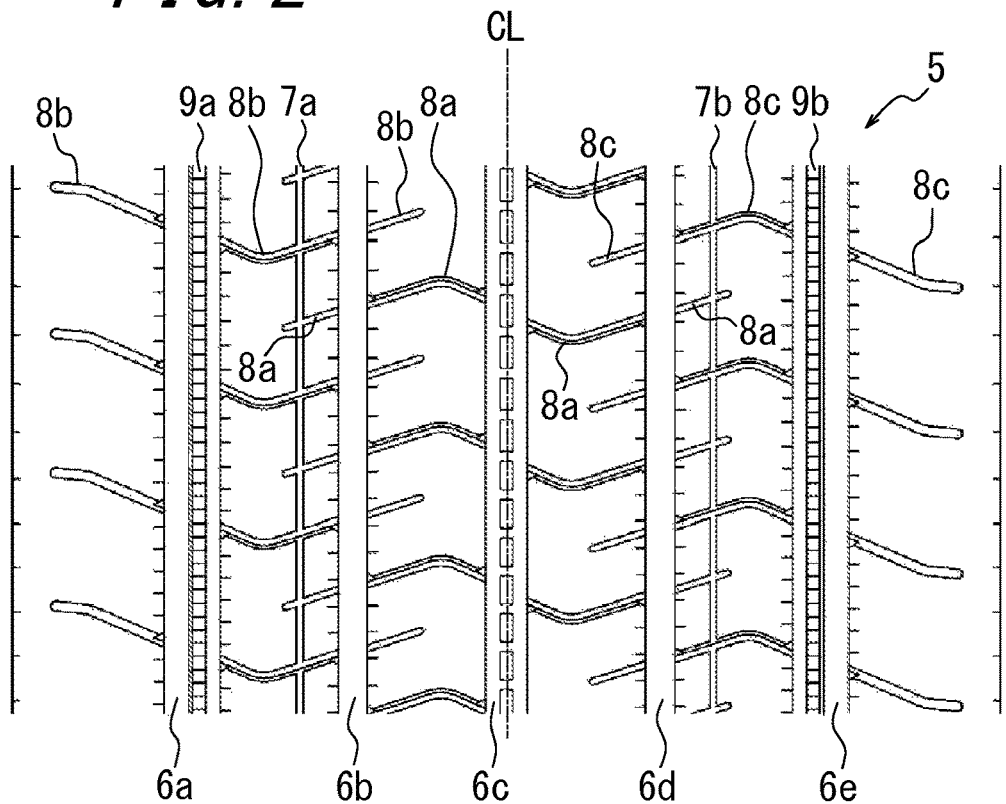
FIG. 2 is a partial development view of a tread pattern of the heavy load tire illustrated in FIG. 1.

As illustrated in FIG. 2, the tread portion 5 has an outer surface that is formed with five circumferential grooves 6a to 6e extending in the tire circumferential direction, fine grooves 7a and 7b extending in the tire circumferential direction, and fine grooves 8a to 8c extending in a zigzag form by being inclined at a small angle with respect to the tire width direction. The fine groove 8a communicates with the three circumferential grooves 6b to 6d that are located in the vicinity of a tire equatorial plane CL and with the fine grooves 7a and 7b. The fine grooves 8b and 8c each communicate with the two circumferential grooves (6a and 6b, or 6d and 6e) that are located on the outer side in the tire width direction and with the fine grooves 7a and 7b.

The circumferential grooves 6a and 6e that are located on the outer sides in the tire width direction are respectively formed with bumps 9a and 9b extending in the tire circumferential direction. The bumps 9a and 9b are each formed with a plurality of sipes extending in the tire width direction.

However, a tread pattern formed on the outer surface of the tread portion 5 in the present embodiment is not limited to the aforementioned configuration.

The first to the fourth belt layer 3a to 3d illustrated in FIG. 1 are each formed of one or more cords that are covered with rubber. The cord of the first belt layer 3a extends in the tire circumferential direction. The cord of the second belt layer 3b extends to be inclined with respect to the tire circumferential direction. The cord of the third belt layer 3c extends to be inclined at an angle of 30° or less with respect to the tire circumferential direction in a direction opposite to that of the cord of the second belt layer 3b. The cord of the fourth belt layer 3d extends to be inclined with respect to the tire circumferential direction.

When a cord extends in a wave form, the center line of amplitude of the cord is construed as the direction in which the cord extends.

Herein, any of the belt layers that include the cords extending at relatively small angles with respect to the tire circumferential direction, such as, especially, the first belt layer 3a, may be formed by helically winding a strip of one or more cords made of steel or like that are covered with rubber, around the outer circumferential side of the carcass 2.

The third belt layer has a width $w_3$ that is 80% or more of the tread width w. The second and the third belt layer respectively have widths $w_2$ and $w_3$, which satisfy the relation $w_2 < w_3$.

The following describes an advantageous effect of the heavy load tire 10 according to the present embodiment.

Generally, a pneumatic tire has a tread portion whose radius is gradually decreased from the center to the shoulder portion. Such a radius difference causes a difference in rolling speed between the center portion and the shoulder portion during rotation of the tire, and shear force acting in the braking direction is generated in the shoulder portion because, in the shoulder portion, the rolling speed is slow relative to the travelling distance on a road surface. The generated shear force has often resulted in partial wear in the shoulder portion.

In this regard, in the heavy load tire 10 of the present embodiment, the cord of the third belt layer 3c is configured to be inclined with respect to the tire circumferential direction in the direction opposite to the direction in which the cord of the second belt layer 3b is inclined. This configuration allows the cord of the second belt layer 3b to intersect with the cord of the third belt layer 3c, thereby improving in-plane bending stiffness (that is, stiffness against bending of the layered belts in an in-plane direction). To enhance this action, the inclination angle of the cord of the third belt layer 3c with respect to the tire circumferential direction is preferably set to be 10° or more.

Furthermore, the cord of the third belt layer 3c is configured to be inclined at an angle of 30° or less with respect to the tire circumferential direction, and the width $w_3$ of the third belt layer 3c is set to be greater than the width $w_2$ of the second belt layer 3b, and moreover, the width $w_3$ is set to be 80% or more of the tread width. The above configurations make it possible to secure out-of-plane bending stiffness (that is, stiffness against bending of the shoulder portion of the belt in the tire radial direction) even in the vicinity of the tread ends 5a and to mitigate shear force acting in the braking direction in the vicinity of the tread ends 5a by positioning flexural center further outward in the tire radial direction, that is, in the vicinity of the third belt layer 3c in the present embodiment, even near the tread ends 5a.

As a result of these actions, the heavy load tire 10 of the present embodiment reduces shoulder edge wear.

To further enhance the advantageous effect of reducing shoulder edge wear, the width $w_3$ of the third belt layer 3c is preferably set to be 90% or more of the tread width so that the flexural centers in regions that are even closer to the tread ends are positioned outward in the tire radial direction, and the inclination of the third belt layer 3c with respect to the tire circumferential direction is preferably set to be 25° or less. Thus, the inclination angle of the cord of the third belt layer 3c with respect to the tire circumferential direction may preferably be set at an angle of 10° or more and 25° or less. Furthermore, the inclination of the cord of the second belt layer 3b with respect to the circumferential direction is preferably set to be 55° or less. In the present embodiment, the width $w_2$ of the second belt layer 3b is preferably set to be 100% or less of the tread width.

Meanwhile, from the viewpoint of securing durability of the tire, the width $w_3$ of the third belt layer 3c is preferably set to be 105% or less of the tread width.

The cord of the first belt layer 3a extends in the tire circumferential direction.

In a state where the tire has been inflated with the inner pressure, especially at the time of rotation of the tire under load, the cord of the first belt layer 3a is subject to tension and acts to prevent the tire from undergoing expansion and deformation. As a result, the shape of the tire is maintained. To enhance this action, the width $w_1$ of the first belt layer 3a is set to be preferably 50% or more, and more preferably 60% or more, of the tread width.

Furthermore, from the viewpoint of improving breaking strength of the cord, the cord of the first belt layer 3a preferably extends in a wave form. Similarly from the viewpoint of improving fracture resistance of the cord, a high elongation cord (for example, a cord having an elongation of 4.5 to 5.5% upon rupture) is preferably used as the cord of the first belt layer 3a.

The cord of the second belt layer 3b is configured to be inclined with respect to the tire circumferential direction. This configuration makes it possible to secure plunger durability (that is, durability against bump input) of the tire. To further improve plunger durability, the inclination angle of the cord of the second belt layer 3b with respect to the tire circumferential direction is preferably set to be greater than 45° and less than or equal to 55°, and the width $w_2$ of the second belt layer is set to be preferably 70% or more, and more preferably 85% or more, of the tread width. Setting the width $w_2$ of the second belt layer to be 70% or more of the tread width also improves steering stability further.

In the heavy load tire 10 of the present embodiment, the fourth belt layer 3d is located outward of the third belt layer 3c in the tire radial direction, and the fourth belt layer 3d extends to be inclined with respect to the tire circumferential direction. The belt width $w_4$ of the fourth belt layer 3d and the direction in which the cord of the fourth belt layer 3d extends may be determined unrestrictedly in accordance with an action to be enhanced. For example, the fourth belt layer 3d acts to further reduce shoulder edge wear and to improve steering stability.

From the viewpoints of further reducing shoulder edge wear by further improving in-plane shear stiffness and of improving steering stability by increasing side force, the cord of the fourth belt layer 3d is preferably configured to be inclined with respect to the tire circumferential direction in the direction opposite to that of the third belt layer 3c in a manner such that the cord of the third belt layer 3c intersects with the cord of the fourth belt layer 3d. To further enhance these effects, the inclination angle of the cord of the fourth belt layer 3d with respect to the tire circumferential direction is set to be preferably 70° or less, and more preferably from 15° to 55°. Furthermore, the width $w_4$ of the fourth belt layer 3d is set to be preferably 20% or more, and more preferably 30% or more, of the tread width w.

From the viewpoint of improving durability of end portions of the belt layers by preventing the end portions of the belt layers from overlapping with each other, the width $w_4$ of the fourth belt layer 3d is preferably set to be less than the width $w_1$ of the first belt layer 3a, and the width $w_4$ of the fourth belt layer 3d is set to be preferably 70% or less (and more preferably 55% or less) of the tread width w.

In the heavy load tire 10 of the present embodiment, the width $w_1$ of the first belt layer 3a is set to be less than the width $w_2$ of the second belt layer 3b, and the reinforcing rubber layers 4 are located inward of the second belt layer 3b in the tire radial direction and each extend from the position that is adjacent to the corresponding outer side of the first belt layer 3a in the tire width direction toward the outer side in the tire width direction. That is to say, the width $w_1$ of the first belt layer 3a is less than the width $w_2$ of the second belt layer 3b, and the widths $w_1$ to $w_3$ of the first to the third belt layer satisfy the relation $w_1<w_2<w_3$. Thus, the further outward a belt layer is located in the tire radial direction, the greater the width of the belt layer. Consequently, as illustrated in FIG. 1, the single reinforcing rubber layer 4 located inward of the second belt layer 3b on each of both ends of the first belt layer 3a being closest to the carcass 2 in the tire width direction suffices to maintain the shapes of the belt layers.

In contrast, when, for example, the relations $w_1>w_2$ and $w_3>w_2$ apply, the reinforcing rubber layers need to be located inward of the first belt layer in the tire radial direction, each reinforcing rubber layer extending from the position that is adjacent to the corresponding outer side of the first belt layer in the tire width direction toward the outer side in the tire width direction. Besides, additional reinforcing rubber layers need to be located inward of the third belt layer in the tire radial direction, each reinforcing rubber layer extending from a position that is adjacent to the corresponding outer side of the second belt layer in the tire width direction toward the outer side in the tire width direction.

Accordingly, by satisfying the relation $w_1<w_2<w_3$, the number of the reinforcing rubber layers required for maintaining the shapes of the belt layers is reduced, resulting in reduction in manufacturing cost of the tire.

Additionally, as the cords used in the second belt layer 3b and/or the third belt layer 3c, steel cords are preferable from the perspective of strength. Although such a steel cord is not limited to a particular type, a cord that, when not being covered with rubber, has a relative elongation of, for example, 0.3% to 2% under tensile force equal to 10% of a breaking load may be used.

The present embodiment is suitably used in a tire having an aspect ratio of 65 or less to reduce shoulder edge wear particularly effectively.

EXAMPLES

Example tires and Comparative Example tires having a size of 355/50R22.5 with the specifications shown below were produced experimentally, and each test tire was subjected to examination of shoulder edge wear resistance, examination of plunger durability, examination of durability in end portions of belt layers, and examination of steering stability as described below.

As illustrated in FIGS. 1 and 2, Example tires 1 to 13 each include a pair of bead portions and a carcass extending toroidally between the pair of bead portions and also include, on an outer circumferential side of a crown region of the carcass, the first belt layer including a cord extending in the tire circumferential direction, the second belt layer including a cord extending to be inclined with respect to the tire circumferential direction, and the third belt layer including a cord extending to be inclined at an angle of 30° or less with respect to the tire circumferential direction in a direction opposite to that of the cord of the second belt layer. The first, the second, and the third belt layer are arranged in the stated order from the inner side to the outer side in the tire radial direction. The widths $w_2$ and $w_3$ of the second and the third belt layer satisfy the relation $w_2<w_3$. In each of the second and the third belt layer, a steel cord that, when not being covered with rubber, has a relative elongation of 0.46% under tensile force equal to 10% of a breaking load is used.

Example tires 1 and 3 to 13 each also include the fourth belt layer having the width $w_4$.

The cord of the second belt layer included in each of Example tires 1 to 12 is configured to extend in a wave form in the tire circumferential direction. On the other hand, the cord of the second belt layer included in Example tire 13 is configured to extend in a straight line form in the tire circumferential direction.

On the other hand, Comparative Example tire 1 has substantially the same configuration as that of Example tire 1 except for that the width $w_3$ of the third belt layer is 74% of the tread width w (the width $w_3$ being 226 mm).

Comparative Example 2 has substantially the same configuration as that of Example tire 1 except for that the cord of the third belt layer extends to be inclined at an angle of 52° with respect to the tire circumferential direction in a direction opposite to that of the cord of the first belt layer.

Comparative Example tire 3 includes a pair of bead portions and a carcass extending toroidally between the pair of bead portions and also include, on an outer circumferential side of a crown region of the carcass, the first and the second belt layer each including a cord extending in the tire circumferential direction, the third belt layer including a cord extending to be inclined at an angle of 52° with respect to the tire circumferential direction, and the fourth belt layer including a cord extending to be inclined at an angle of 52° with respect to the tire circumferential direction in a direction opposite to that of the cord of the third belt layer. The first, the second, the third, and the fourth belt layer are arranged in the stated order from the inner side to the outer side in the tire radial direction. The widths $w_1$ to $w_4$ of the first to the fourth belt layer are respectively 74% (226 mm), 74% (226 mm), 95% (290 mm), and 85% (260 mm) of the tread width w (305 mm). Except for the above differences, Comparative Example tire 3 has the same configuration as that of Example tire 1.

Table 1 shows the specifications of Example tires and Comparative Example tires mentioned above. Note that signs assigned to the inclination angles of the cords of the first to the fourth belt layer with respect to the tire circumferential direction shown in Table 1 basically represent, when plus, that the cords are inclined with respect to the tire circumferential direction in a direction same as that of the cord of the second belt layer, and represent, when minus, that the cords are inclined with respect to the tire circumferential direction in the direction opposite to that of the cord of the second belt layer. As for Comparative Example tire 3, however, the inclination angle of the cord of the third belt layer is defined as plus, and the signs shows that the cord of the third belt layer and the cord of the fourth belt layer are inclined in directions opposite to each other with respect to the tire circumferential direction.

Each test tire was assembled with a rim having a rim size of 11.75 inches, inflated at 900 kPa, and applied with a load of 4000 kgf, and then, was subjected to the following examinations.

<Examination of Shoulder Edge Wear Resistance>

Example tires 1 to 13 and Comparative Example tires 1 to 3 were each assembled to a steering axis of a vehicle, and the vehicle was driven on an actual public road for 100,000 km. Subsequently, shoulder edge wear resistance was evaluated by measuring, for each tire, a wear amount (that is, an amount of change in height in the tire radial direction, hereinafter the same) of a tread end portion and a wear amount (that is, an amount of change in depth of a shoulder main groove) of a center block, and by comparing respective inverses of differences between the wear amounts measured for the tires. The evaluation results are shown in Table 1 based on the evaluation result of Comparative Example tire 3 being 100. Larger numerical values represent better shoulder edge wear resistance.

<Examination of Plunger Durability>

In accordance with the breaking energy test specified by JIS D 4230, for each of Example tires 1 to 11 and Comparative Example tires 1 to 3, the plunger was pressed against the tread portion, and then, pushing force of the plunger immediately before the tire broke down and a travelling distance were examined, and the product of both values examined was obtained. The examination results were indexed with the examination result of Comparative Example tire 3 being defined as 100 for relative evaluation. Table 1 shows results of the evaluation. Larger numerical values represent better plunger durability.

<Examination of Durability in End Portions of Belt Layers>

Example tires 1 to 4 and 13 were each assembled to an outside drum-type tester and driven for 20,000 km. Subsequently, for each tire, the length of a crack occurring between an end of the second belt layer in the tire width direction and an end of the third belt layer in the tire width direction was measured, and then, durability in the end portions of the belt layers was evaluated by comparing the respective inverses of the lengths measured for the test tires. The evaluation results are shown in Table 1 based on the evaluation result of Comparative Example tire 2 being 100. Larger numerical values represent better durability in the end portions of the belt layers.

<Examination of Steering Stability>

Cornering power of each of Example tires 1 to 4 and 13 was measured by using a flat-belt cornering tester. The cornering power of Example tire 2 was defined as 100 for relative evaluation of steering stability. Table 1 shows results of the evaluation. Larger numerical values represent better steering stability.

TABLE 1

|  |  | Example tire 1 | Example tire 2 | Example tire 3 | Example tire 4 | Example tire 5 | Example tire 6 | Example tire 7 | Example tire 8 | Example tire 9 |
|---|---|---|---|---|---|---|---|---|---|---|
| First belt layer | Inclination angle of cord (°) | 0 | 0 | 0 | 0 | 0 | 0 | 0 | 0 | 0 |
|  | $w_1/w$(%) | 74 | 74 | 74 | 74 | 74 | 74 | 60 | 74 | 74 |
| Second belt layer | Inclination angle of cord (°) | +50 | +50 | +50 | +50 | +16 | +50 | +50 | +50 | +50 |
|  | $w_2/w$(%) | 91 | 91 | 91 | 91 | 91 | 60 | 70 | 85 | 91 |
| Third belt layer | Inclination angle of cord (°) | −16 | −16 | −16 | −16 | −16 | −16 | −16 | −16 | −16 |
|  | $w_3/w$(%) | 95 | 95 | 95 | 95 | 95 | 95 | 80 | 90 | 100 |
| Fourth belt layer | Inclination angle of cord (°) | +16 | — | +16 | −16 | +16 | +16 | +16 | +16 | +16 |
|  | $w_4/w$(%) | 46 | — | 85 | 46 | 46 | 46 | 46 | 46 | 46 |
| Shoulder edge wear resistance |  | 129 | 118 | 132 | 118 | 130 | 108 | 108 | 114 | 131 |
| Plunger Durability |  | 108 | 105 | 110 | 108 | 90 | 104 | 106 | 106 | 109 |
| Durability in end portions of belt layers |  | 98 | 100 | 85 | 102 |  |  |  |  |  |
| Steering stability |  | 105 | 100 | 108 | 101 |  |  |  |  |  |

|  |  | Example tire 10 | Example tire 11 | Example tire 12 | Example tire 13 | Comparative Example tire 1 | Comparative Example tire 2 | Comparative Example tire 3 |
|---|---|---|---|---|---|---|---|---|
| First belt layer | Inclination angle of cord (°) | 0 | 0 | 0 | 0 | 0 | 0 | 0 |
|  | $w_1/w$(%) | 74 | 74 | 74 | 74 | 74 | 74 | 74 |
| Second belt layer | Inclination angle of cord (°) | +50 | +50 | +50 | +50 | +50 | +50 | 0 |
|  | $w_2/w$(%) | 91 | 91 | 100 | 91 | 91 | 91 | 74 |

TABLE 1-continued

|  |  |  |  |  |  |  |  |
|---|---|---|---|---|---|---|---|
| Third belt layer | Inclination angle of cord (°) | −16 | −30 | −16 | −16 | −16 | −52 | +52 |
|  | $w_3/w$(%) | 105 | 95 | 105 | 95 | 74 | 95 | 95 |
| Fourth belt layer | Inclination angle of cord (°) | +16 | +16 | +16 | +16 | +16 | +16 | −52 |
|  | $w_4/w$(%) | 46 | 46 | 46 | 46 | 46 | 46 | 85 |
| Shoulder edge wear resistance | | 131 | 115 | 130 | 129 | 90 | 90 | 100 |
| Plunger Durability | | 108 | 106 | | 108 | 107 | 111 | 100 |
| Durability in end portions of belt layers | | | | | 98 | | | |
| Steering stability | | | | | 105 | | | |

It has been found from Table 1 that Example tires 1 to 13 exhibit improved shoulder edge wear resistance compared with Comparative Examples 1 to 3.

Furthermore, Example tires 1 to 4, 7 to 11, and 13, in each of which the cord of the second belt layer is inclined at an angle that is greater than 45° with respect to the tire circumferential direction and which the width $w_2$ of the second belt layer is 70% or more of the tread width, exhibit improved plunger durability compared with Example tires 5 and 6.

Moreover, Example tires 1, 3, and 4, each of which includes the fourth belt layer, exhibit improved steering stability compared with Example tire 2 which does not include the fourth belt layer.

Figure 3:
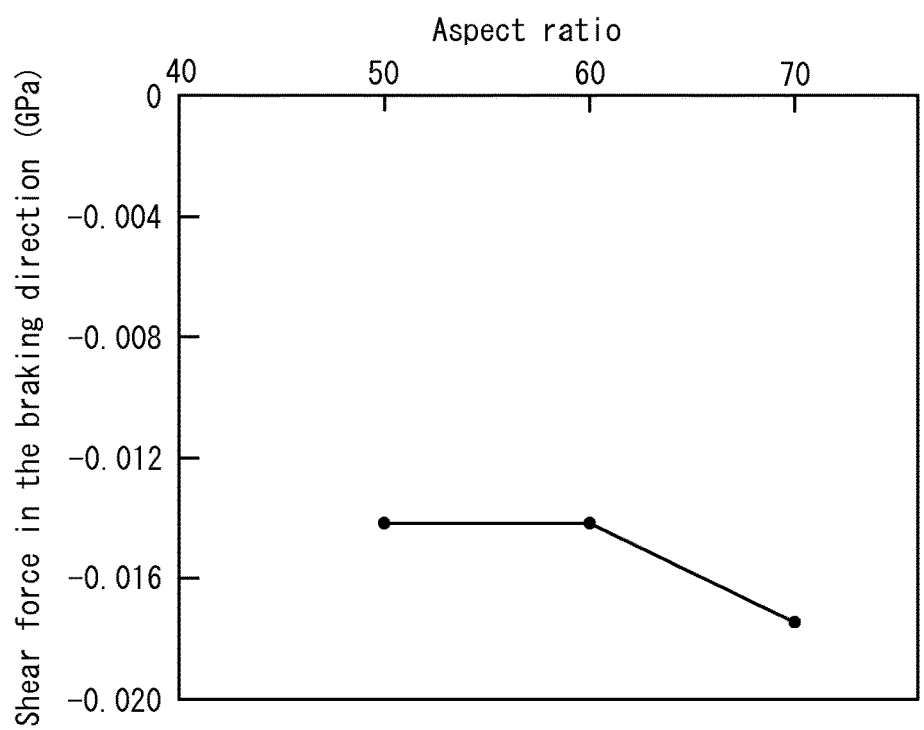
FIG. 3 is a graph illustrating a relation between an aspect ratio and shear force in the braking direction in a heavy load tire according to the present disclosure.

Besides, although each tire subjected to the aforementioned examinations had an aspect ratio of 50, the aspect ratio of Example tire 1 described above was varied to simulate shear force applied to the shoulder portion in the braking direction. The simulation results are shown in FIG. 3. Shoulder edge wear is less likely to occur as shear force acting in the braking direction is closer to zero.

As is clearly seen from FIG. 3, in the heavy load tire of the present embodiment, as the aspect ratio is decreased, shear force acting in the braking direction is closer to zero, and shoulder edge wear is further prevented.

REFERENCE SIGNS LIST

1: bead portion
2: carcass
3a to 3d: first to fourth belt layers
4: reinforcing rubber layer
$w_1$ to $w_4$: widths of first to fourth belt layers
w: tread width
10: heavy load tire

The invention claimed is:

1. A heavy load tire comprising:
a pair of bead portions; and
a carcass extending toroidally between the pair of bead portions, an outer circumferential side of a crown region of the carcass comprising:
  a first belt layer comprising a cord extending in a tire circumferential direction or in a direction inclined at an angle of less than 10° with respect to the tire circumferential direction;
  a second belt layer comprising a cord inclined at an angle of greater than 45° and less than or equal to 55° with respect to the tire circumferential direction;
  a third belt layer comprising a cord inclined at an angle of 10° or more and 25° or less with respect to the tire circumferential direction in a direction opposite to the angle of the cord of the second belt layer;
  a fourth belt layer comprising a cord inclined at an angle from 15° to 55° with respect to the tire circumferential direction; and
  tread rubber located outward of the first, second, third, and fourth belt layers in a tire radial direction, wherein:
the first belt layer, the second belt layer, the third belt layer, and the fourth belt layer are arranged in sequence from an inner side of the tire to an outer side in the tire radial direction,
the third belt layer has a width $w_3$ that is 80% or more of a tread width w, which is a length between tread ground contact ends of the tread rubber, and 105% or less of the tread width w,
the second belt layer has a width $w_2$ such that $w_2 < w_3$ and $w_2$ is 70% or more and less than or equal to 100% of the tread width w,
the first belt layer has a width $w_1$ that is 50% or more of the tread width w, and
the fourth belt layer has a width $w_4$ that is 20% or more and 70% or less of the tread width w.

2. The heavy load tire of claim 1, wherein the width $w_3$ of the third belt layer is 90% or more of the tread width w.

3. The heavy load tire of claim 1, further comprising:
a reinforcing rubber layer located inward of the second belt layer in the tire radial direction, the reinforcing rubber layer extending from positions located outward of the first belt layer in a tire width direction toward outer sides in the tire width direction, wherein the width $w_1$ of the first belt layer is less than the width $w_2$ of the second belt layer.

4. The heavy load tire of claim 3, wherein:
the first, second, third, and fourth belt layers are the only belt layers in the heavy load tire,
the heavy load tire has an aspect ratio of 65 or less, and
the cords of the second and third belt layers are steel cords that each have a relative elongation of 0.3% to 2% under tensile force equal to 10% of a breaking load.

5. The heavy load tire of claim 1, wherein $w_1 > w_4$.

\* \* \* \* \*